April 16, 1963 F. J. ALTERMANN 3,086,200
TERRAIN CLEARANCE SYSTEM
Filed Jan. 22, 1957 3 Sheets-Sheet 1

INVENTOR.
FRANCIS J. ALTERMANN
BY
Stuart R. Peterson
ATTORNEY

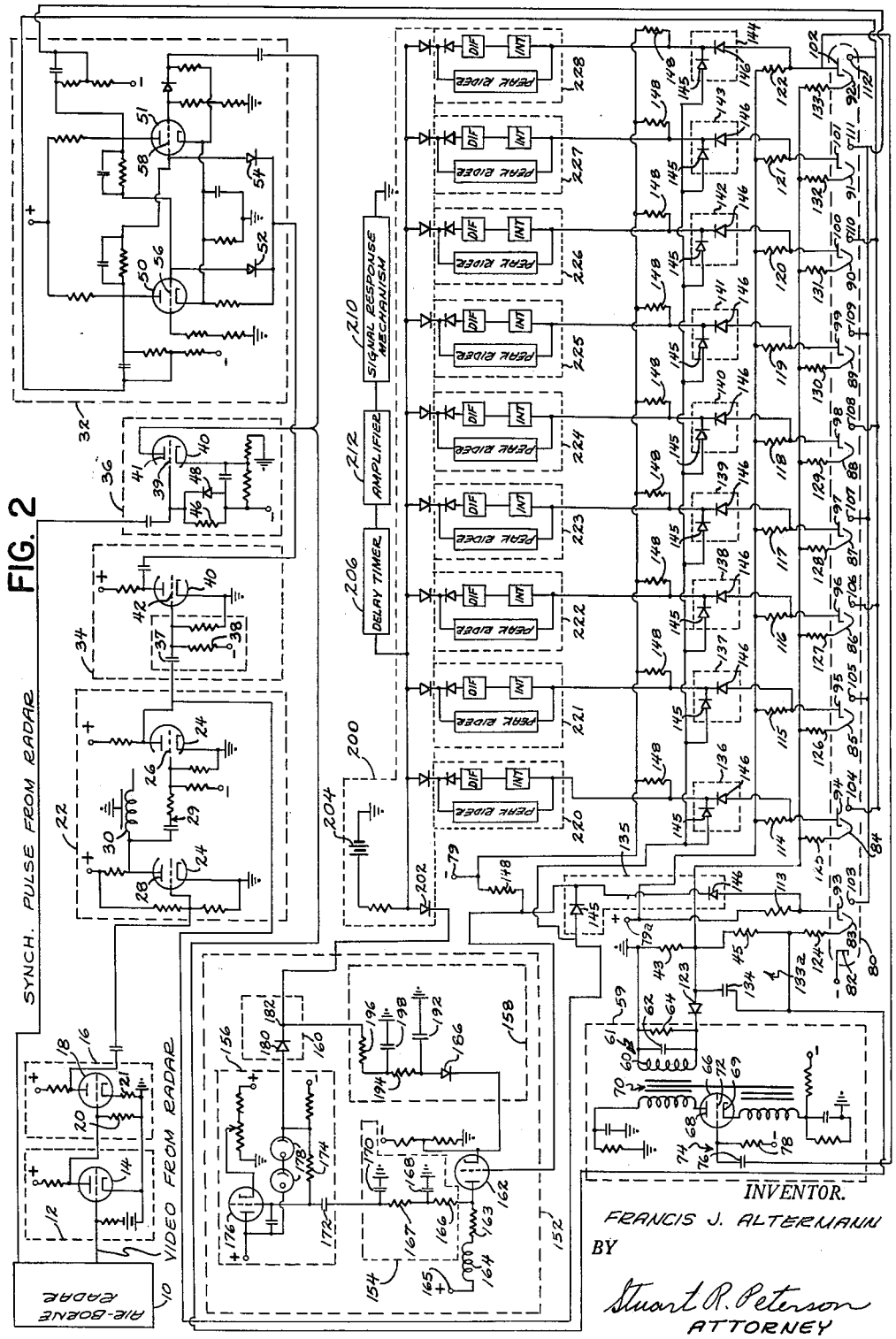

April 16, 1963   F. J. ALTERMANN   3,086,200
TERRAIN CLEARANCE SYSTEM
Filed Jan. 22, 1957   3 Sheets-Sheet 3
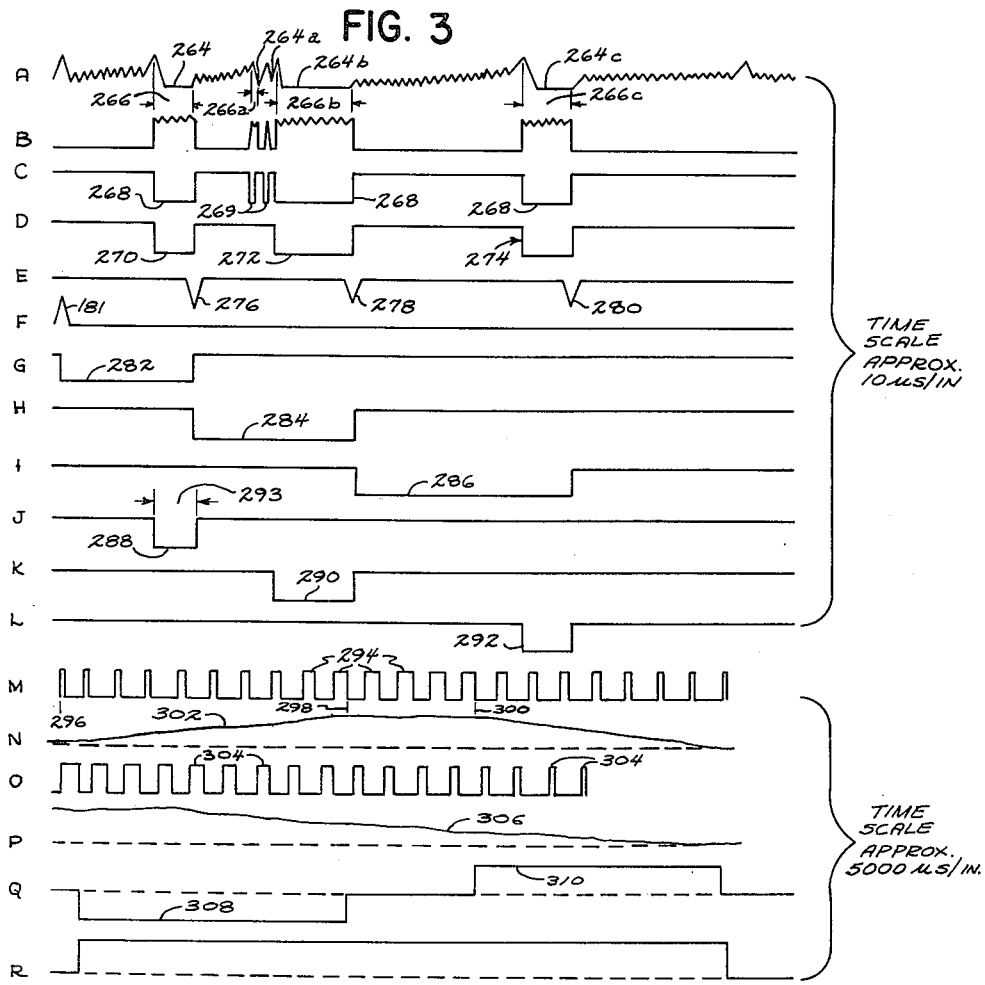
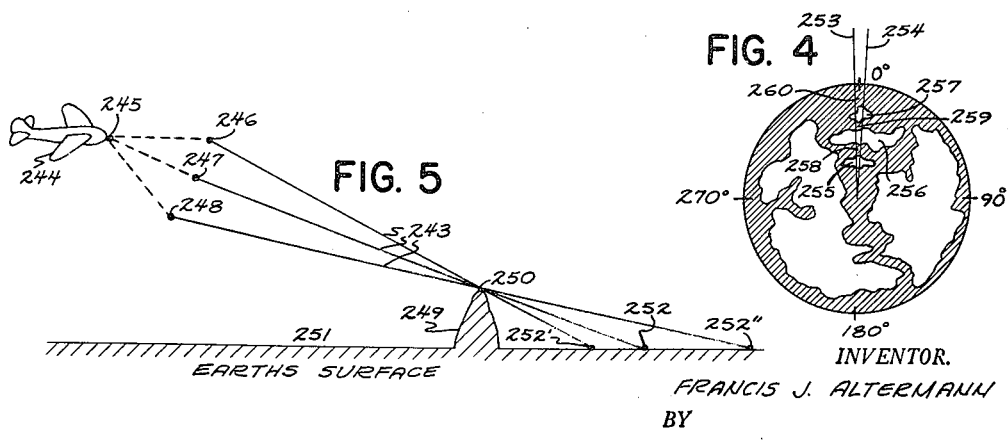
INVENTOR.
FRANCIS J. ALTERMANN
BY
Stuart R. Peterson
ATTORNEY

United States Patent Office 3,086,200
Patented Apr. 16, 1963

3,086,200
TERRAIN CLEARANCE SYSTEM
Francis J. Altermann, Minneapolis, Minn., assignor to General Mills, Inc., a corporation of Delaware
Filed Jan. 22, 1957, Ser. No. 635,274
48 Claims. (Cl. 343—5)

This invention relates generally to air-borne radar apparatus. More particularly, the invention is concerned with a novel terrain clearance system which may be used in conjunction with conventional radar sets for determining when the aircraft is traversing a dangerous course which, if continued, would result in a collision with an obstacle projecting upwardly from the ground.

When an air-borne radar set having a fan beam antenna pattern is flown at low altitudes above the surface of the earth, there are usually shadows in the radar display caused by geographical features which shut off the radar beam from all targets in the "shadow" areas behind them. Such shadows are caused by obstacles which are of the order of magnitude of one beam width or wider; at long ranges the shadows are defined clearly for large obstacles and the sensitivity, that is the occurrence of shadows, increases greatly as the radar approaches the obstacle. Broadly, the present invention comprehends the production of signals having a function or characteristic representative of the length of these shadows. By determining whether the function or characteristic imparted to the signal is changing in a certain manner, it can be ascertained if the craft is following a safe or dangerous path.

Accordingly, one important object of the invention is to provide a system capable of determining whether the aircraft when equipped with my system is following a safe course with respect to various obstacles.

Another object is to provide a terrain clearance system that may be employed in combination with conventional radar sets, the system being easily and quickly connected thereto. Also, it is an aim of the invention to provide a system for effectively determining topographical clearance that is unaffected by weather, being capable of use whenever the radar set is in operation.

Another object of the invention is to provide a system of the foregoing character that will be both compact and lightweight, thereby encouraging its widespread adoption on all types of aircraft.

A further object is to provide a terrain clearance system capable of handling and processing shadow information derived from a plurality of objects. More specifically, it is planned that a number of shadow analyzing channels be provided and by virtue of a sequential switching arrangement each channel be activated in its proper turn.

A still further object of the invention is to provide a terrain clearance system in which the rate of change in shadow lengths is automatically studied by electrical means, an alarm or control being energized whenever the shadow lengths are increasing or remaining constant (the latter signifying a grazing course with respect to the obstacle or obstacles). In this regard, it is also an aim of the invention to prevent the energization of the alarm or other control in the absence of any shadows, thereby enhancing the utility and reliability of the system.

Yet another object is to exclude the effect of very short shadows which will be of little or no consequence and which would otherwise only tend to congest the system and require added analyzing channels.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

FIG. 2 is a schematic view of the circuit of the preferred embodiment of the invention, the view showing the components of the terrain clearance system used in conjunction with a radar set;

FIG. 3 shows time-voltage curves A to R characteristic of the signals appearing in the circuits of FIGS. 1 and 2;

FIG. 4 illustrates shadows in a PPI display during a low level flight over rugged terrain; and FIG. 5 shows certain radar signal returns to an aircraft flying toward an obstacle.

Figure 1:
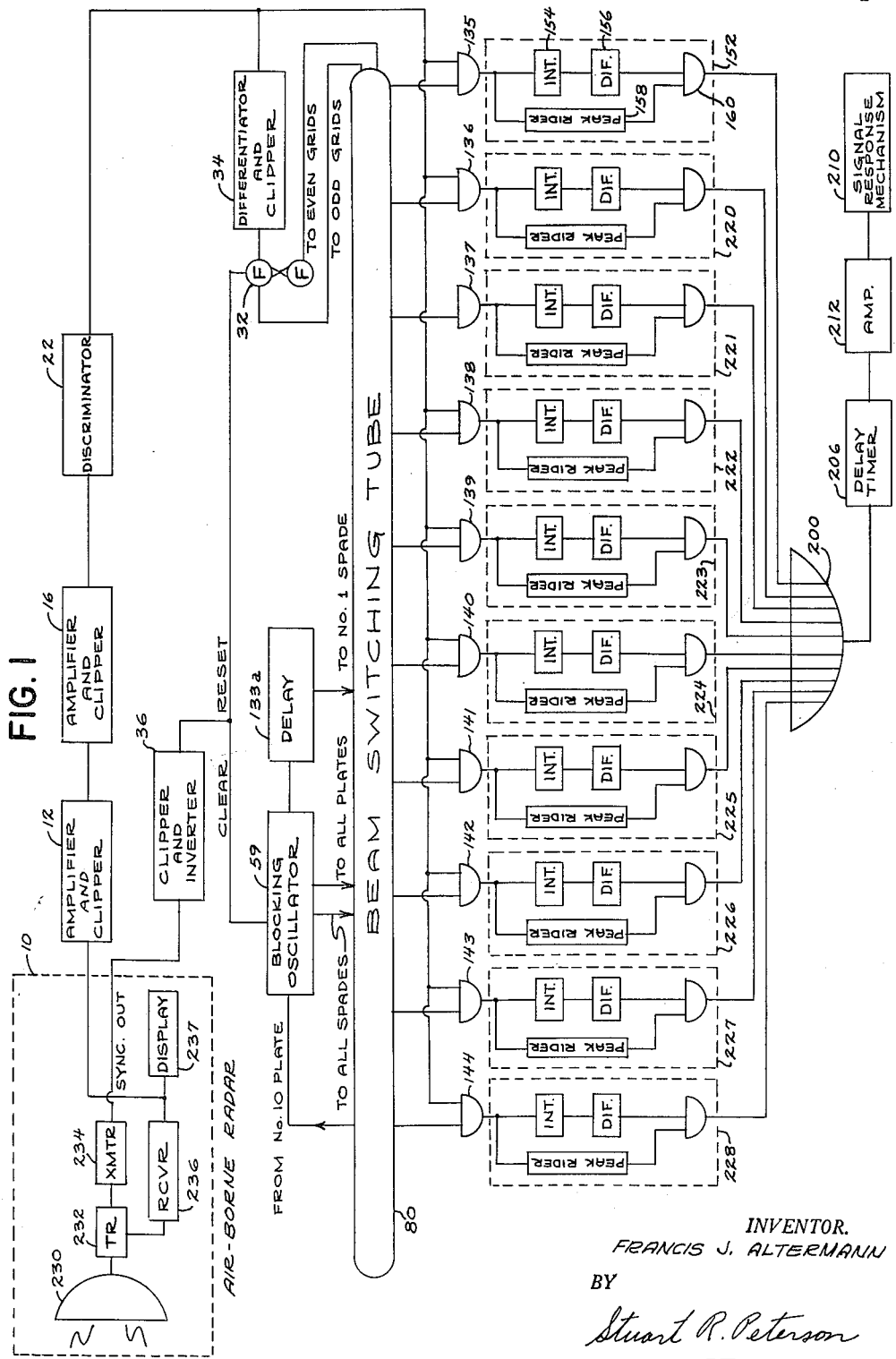
FIGURE 1 is a block diagram of the terrain clearance system in combination with a conventional air-borne radar set.

Referring now to the details of the circuit as shown in FIG. 2, a conventional air-borne radar set 10 is coupled to a video signal amplifier, and clipper circuit 12 containing a triode 14, the grid of which has impressed thereon the video signals from the radar set 10. As is conventional the circuit 12 performs an inherent inversion function and the inverted signal from this circuit traverses an amplifier and clipper circuit 16 in which a triode 18 is biased slightly above cut off by the proper selection of resistance 20. Since the circuit 16 also acts as an inverter, the signal is reinverted. The triode 18 is connected in a normal manner having a resistance 21 in its cathode circuit. Linked to the amplifier and clipper circuit 16 is a discriminating circuit 22 for preventing the passage of pulses having less than a predetermined width, the circuit including a double triode 24 with the grid 26 on one half of the triode connected to the plate 28 of the other half through a normal capacitor resistor type coupling 29 with a delay line 30 also attached to the plate 28.

A flip-flop circuit 32 obtains energy from the discriminator circuit 22 through a differentiator and clipper circuit 34. Capacitor 37 and resistor 38 form the differentiator portion of the circuit 34 and one half of a double triode 40 acts as the clipper portion of circuit 34, being biased at cut off so that only a positive going pulse applied to its grid 42 will produce an output signal.

The flip-flop 32 and a potentiometer consisting of resistors 43 and 45 are both energized by a pulse passing through a main bang clipper and inverter circuit 36, said pulse being derived from and therefore synchronized with each radar pulse emitted from radar 10. In the circuit 36 a parallel connected resistance 46 and diode 48 clip any negative overrun appearing in the synchronized pulse from radar 10, before said pulse is applied to the grid 39 of tube 40.

The flip-flop circuit 32 contains all of the regularly found elements which include triodes 50 and 51 and two crystal rectifiers 52 and 54 connected to the individual grids 56 and 58. The grid 58 is joined to the plate 41 of tube 40 to insure that the tube 51 will be initially cut off by the synchronized pulse from radar 10. The circuit 32 therefore operates in a normal flip-flop manner.

A blocking oscillator circuit 59 connected across resistor 43 contains in addition to a parallel connected combination 61 of inductance 60, capacitance 62, and resistance 64, a triode 66 whose plate 68 and cathode 69 are linked to transformer 70. Any impulse received by the grid 72 of tube 66 must traverse a differentiator 74 composed of a capacitor 76 and a resistor 78. The remainder of the blocking oscillator 59 is conventional with tube 66 operating at cut off.

A beam switching tube 80 similar to the one on pages 122 to 126 of Electronics, April 1956, operates as therein described. The tube is comprised of a cathode 82, ten spades 83, 84, 85, 86, 87, 88, 89, 90, 91 and 92, ten target plates 93, 94, 95, 96, 97, 98, 99, 100, 101 and 102, five odd grids 103, 105, 107, 109 and 111, and five even grids 104, 106, 108, 110 and 112. The five odd grids 103, 105, 107, 109 and 111 are linked to the plate of tube 51 and the five even grids 104, 106, 108, 110 and 112 are associated with the plate of tube 50. Plate 102 is connected to the capacitor 76 of differentiator 74. A positive voltage source 79a is coupled to target plates 93, 94, 95, 96, 97, 98, 99, 100, 101 and 102 by resistances 113, 114, 115, 116, 117, 118, 119, 120, 121 and 122 respectively. The ungrounded side of the combination 61 is joined through a diode 123 and resistances 125, 126, 127, 128, 129, 130, 131, 132 and 133 to spades 84, 85, 86, 87, 88, 89, 90, 91 and 92. Spade 83 is attached to the plate of the diode 123 through a resistance 124 and a delay 133a comprising the parallel combination of a capacitor 134 and the resistor 45. The purpose of the capacitor 134 is to delay the return to ground potential of the spade 83 after receipt of a signal from the main bang clipper and inverter 36.

"And" gate circuits 135, 136, 137, 138, 139, 140, 141, 142, 143 and 144, each composed of two diodes 145, 146 with their cathodes connected simultaneously receive at the plates of the diode 145 any signals permitted to traverse discriminating circuit 22. The target plates 93, 94, 95, 96, 97, 98, 99, 100, 101 and 102 are linked to the plates of the diodes 146 of "and" gate circuits 135, 136, 137, 138 139, 140, 141, 142, 143 and 144 respectively. A negative bias 79 of 105 volts is applied through individual resistances 148 to each junction of the diodes 145 and 146 in "and" gate circuits 135, 136, 137, 138, 139, 140, 141, 142, 143 and 144.

Coupled to the "and" gate circuit 135 is an analyzing circuit 152 containing an integrator circuit 154, a differentiator circuit 156, a peak rider circuit 158, and an "and" gate circuit 160.

In the analyzing circuit 152 is a triode 162 whose grid is coupled to the "and" gate circuit 135. A resistor 163 and an inductor 164 are in series between the plate of tube 162 and a voltage supply 165. Also attached to the plate of tube 162 is the integrator circuit 154 including a resistor 166 and a resistor 167 with the individual ends of the resistor 167 being shunted to ground by capacitors 168 and 170 respectively. The combination of the resistors 166 and 167 with the capacitors 168 and 170 perform the actual integrating function of circuit 154.

The output of the integrator circuit 154 is impressed on the differentiator circuit 156 comprising a capacitor 172, a resistor 174, a triode 176 and two neon tubes 178. The capacitor 172 and resistor 174 together accomplish the differentiation function of circuit 156 and the two neon tubes 178 act as a constant voltage drop between the plate of tube 176 and the output voltage of the circuit 156.

The output voltage of differentiator circuit 156 is fed to "and" gate circuit 160 comprising diode 180 and junction 182.

Coupled to the cathode of triode 162 of the analyzing circuit 152 is the peak rider circuit 158 containing a diode 186. The plate of the tube 186 is connected to ground through a capacitor 192. The common point between the diode 186 and the capacitor 192 is linked to the junction 182 of "and" gate circuit 160 by resistors 194 and 196 in series having their common point shunted to ground by a capacitor 198.

The voltage output of "and" gate circuit 160 is impressed upon an "or" gate circuit 200 comprising a diode 202 and a voltage supply 204. The circuit of the tube 202 is entirely conventional, the output thereof being coupled to a delay timer or discriminator circuit 206. The delay timer circuit is also conventional with the output being applied through an amplifier 212 to a signal response mechanism 210 which may be an alarm or auto pilot. For the purpose of simplifying the ensuing description, however, the device 210 will be referred to only as an alarm.

Analyzing circuits 220, 221, 222, 223, 224, 225, 226, 227 and 228 all similar to circuit 152 are coupled to "and" gate circuits 136, 137, 138, 139, 140, 141, 142, 143 and 144 respectively and individually linked to the alarm 210 through the amplifier 212.

For the purpose of illustration, the embodiment of my invention drawn in FIG. 2 has been shown as operating with one beam switching tube 80 actuating ten identical analyzing circuits like 152, these identical circuits having already been designated by the numerals 220, 221, 222, 223, 224, 225, 226, 227 and 228. Let it be understood from the outset that my invention is by no means limited to one or any other number of beam switching tubes or analyzing circuits.

Referring to FIG. 1, numeral 10 designates symbolically an air-borne radar set provided with an antenna 230, a transmitter-receiver switching circuit 232, a transmitter 234, a receiver 236, and a radar display 237.

The terrain clearance system illustrated schematically in FIG. 2 is depicted in block form connected to transmitter 234 and the receiver 236 of the conventional radar set 10.

The operation of the terrain clearance system energized from the video output of the receiver 236 is based on the existence of shadow (no echo) areas behind upwardly projecting reflective targets or obstacles. For ease of explanation, FIG. 5 pictures exemplary returns 243 from a very narrow beam radar in an aircraft 244 flying over terrain with a profile in the plane of the radar beam. The dotted lines from point 245 to points 246, 247 and 248 indicate possible flight paths of the aircraft. With the aircraft 244 at point 245 the grazing radar path touches an obstacle 249 at point 250 and the earth 251 at point 252 on the far side of the obstacle. There will ordinarily be a shadow in the radar display 237 for ranges X, where $\overline{245\ 250} < X < \overline{245\ 252}$. FIG. 4 illustrates how these shadows will appear on a PPI scope as the aircraft flies over terrain with the small area between lines 253 and 254 being that viewed by a single narrow beam radar. The white spots 255, 256 and 257 depict obstacles and the dark areas 258, 259 and 260 are the shadows cast by these respective objects. The length of the shadow for obstacle 249 is $\overline{250\ 252}$. If the aircraft 244 flies a "safe" course from 245 to 246, the distance $\overline{250\ 252}$ will decrease to $\overline{250\ 252'}$. Consequently, the rate of change of length of shadow $\overline{250\ 252}$ is an indication of whether or not a safe course is being flown. This is the fundamental quantity used in the terrain clearance system.

The interpretation of the change in length of three shadows which are similar to the shadows 258, 259 and 260 by the circuit in FIG. 1 is graphically set forth in FIG. 3 in which curve A represents the video output of the receiver 236 applied to radar display 237 and the amplifier, and clipper 12. The low energy ebbs or periods of substantially no voltage characterized by 264, 264a, 264b and 264c in curve A indicate shadow areas whose length is proportional to the distance 266, 266a, 266b and 266c respectively. This distance can be measurable as shown or infinite. The signal emitted by the amplifier, and clipper 12 appears like curve B, owing to its inversion, before entering the amplifier and clipper 16 to emerge as the relatively clean series of shadow pulses 268 and 269 seen in curve C. Curve C, which has been reinverted illustrates the impulses fed to the discriminator circuit 22. The parameters of the discriminator 22 are selected to allow only the energy of curve C lasting longer than a predetermined time to pass through it to thus eliminate short duration shadow pulses 269, which are assumed to be of no consequence, from the output curve D. To simplify the further explanation of operation only the shadow pulses produced by three apparently dangerous objects will be used in the following discussion. The shadow pulses 270, 272 and 274 of curve D from the three objects in the path of the aircraft must be examined individually in order to determine if any one of them is cast by a dangerous object. This is accomplished by gating each serially received shadow pulse, such as 270, 272 and 274, to separate circuits like 152 where the pulses are analyzed to determine their risk as hereafter explained.

Curve D, the output of the discriminator 22, is impressed simultaneously upon one of the inputs of the "and" gate circuits 135, 136, 137, 138, 139, 140, 141, 142, 143, 144 and the differentiator and clipper 34. The parameters of the differentiator and clipper 34 are so arranged that only the positive going, trailing edges of pulses 270, 272 and 274 are evaluated and produce output pulses or pips 276, 278 and 280 respectively as seen in curve E. Each negative trigger pulse 276, 278 and 280 is applied to the flip-flop 32 at the ending of each shadow pulse 270, 272 and 274. These negative pulses or pips switch said flip-flop so that at the end of each shadow, the grids of the magnetron beam switching tube 80 are pulsed at the proper potential to enable the transfer of the electron beam from one target plate to the adjacent target plate in proper sequence thus energizing the other input of the "and" gate circuits 135, 136, 137, 138, 139, 140, 141, 142, 143 and 144 in turn. As disclosed in pages 122 to 126 of Electronics, April 1956, the electron beam of the magnetron beam switching tube can also be transferred from one target plate to another by proper pulses to the spade associated with the target plate on which it is desired to have the beam.

At the beginning of each series of shadow pulses, a synchronizing pulse 181 as seen in curve F and derived from each radar pulse emitted by radar set 10 is received by the terrain clearance system from the radar set 10. The pulse 181 therefore corresponds in time with the transmission of energy from the radar 10. This synchronizing pulse 181 resets the magnetron beam switching tube 80 by applying a large negative potential from the clipper and inverter 36 to all the spades of the tube 80. This potential essentially cuts off any conduction within the tube 80 from the cathode to any of the plates and is held for about one microsecond. On return of the spades to normal potential, the spade which is last to return causes the beam to form on its associated plate. Therefore, due to the delay 133a, a few microseconds after receipt of the synchronizing pulse, curve F, the beam of the magnetron beam switching tube 80 is focused on the first plate 93. This supplies one input to the "and" gate 135 making it ready to pass a pulse proportional to the first shadow pulse 270, upon receipt of pulse 270 at the number "one" "and" gate 135.

The "and" gate 135 only has an output when it has two inputs at the same time. As stated previously the signals 270, 272 and 274 in curve D are fed simultaneously to the "and" gates 135, 136, 137, 138, 139, 140, 141, 142, 143, and 144. The other inputs to the first three "and" gates 135, 136 and 137 appear as curves G, H and I when the beam is successively on target plates 93, 94 and 95 of tube 80. Therefore when a pulse 282, shown in a curve G, from tube 80 and shadow pulse 270 occur at "and" gate 135 during the same time interval, the shadow pulse 288 of curve J will be passed to the analyzing circuit 152. When pulse 284 of curve H from the tube 80 and the shadow pulse 272 occur at "and" gate 136 during a later time interval, a shadow pulse 290 of curve K will be passed to the analyzing circuit 220. Similarly when a pulse 286 of curve I and the pulse 274 appear at "and" gate 137 during a still later interval, a shadow pulse 292 will be passed to the analyzing circuit 221. This repeats for each succeeding analyzing circuit.

The "and" gate 136 is made ready for receipt of the "second" shadow pulse 272 and passage of a pulse proportional thereto by switching the magnetron beam switching tube 80 to the next adjacent target plate, i.e. from plate 93 to plate 94. This is accomplished as previously stated by the negative pip 276 from the end of shadow "one," pulse 270. The succeeding "and" gates 137, 138, 139, 140, 141, 142, 143 and 144 are opened successively in a similar manner.

In the event that more than ten shadows occur, the tenth target plate 102 of the magnetron beam switching tube 80 is coupled to the blocking oscillator 59, so that on conclusion of the tenth shadow, the blocking oscillator 59 is pulsed as well as the flip-flop 32, so that instead of the transfer of the beam of the tube 80 to the target plate coupled to the "number one" analyzing circuit 152, all target plates are cut off by a large negative pulse from the blocking oscillator 59 impressed on all the spades of tube 80. This negative potential is not applied via the delay circuit 133a, as in the case of the synchronizing reset pulse. As a result, on conclusion of the pulse, all spades return simultaneously to their normal potential and the beam of the tube 80 does not form. Therefore, after gating analyzing circuit "ten," circuit 228, the tube is cut off. On receipt of the synchronizing pulse 181 of curve F the beam is caused to form on plate "one," 93, of tube 80 as previously described.

On receipt of the shadow pulse 288, the integrator 154 will develop an analog D.C. voltage proportional to and thus indicative of the width 293 of said pulse. If the successive shadow pulses fed to the integrator 154 do not change in width, the D.C. voltage will remain at a constant value. If each successive shadow pulse increases in width with time the D.C. voltage from the integrator 154 will increase. If each successive shadow pulse grows narrower with time the D.C. voltage from the integrator 154 will decrease. This is illustrated by curves M and N. Curve M shows a series of pulses 294, each similar to single pulse 288 and each being derived from the same obstacle but from successive main bang pulses emitted by the radar 10. The shadow pulses 294 are shown to increase in width with time from the time zero 296 to time 298, being steady in width during time 298 to 300 and then decreasing in width after time 300. The corresponding integrator output voltage 302 is in analog form as shown by curve N.

During some other period the pulses 304 may be decreasing steadily in width with time and they would appear as curve O. The corresponding integrator output 306 will appear as curve P.

The D.C. voltage from the integrator 154 is fed to the differentiator 156 which generates a D.C. voltage proportional to the rate of change of said input voltage. When the rate of change of the input voltage is zero, the differentiator output is steady at a value represented by the dashed line of curve Q.

When the shadow pulses 294 of curve M begin to get wider, a negative constant voltage 308 of curve Q is generated by the differentiator 156. As the shadow pulses 294 remain steady in width, the output voltage drops back to a constant depicted by the dashed line of curve Q. Later at time 300, curve M, when the shadow pulses 294 decrease in width, a positive voltage 310 of curve Q is generated.

Where, as in curve O, the pulse width 304 is continually decreasing, the differentiator output is positive as shown in curve R.

The alarm 210 is set so that if a shadow pulse width does not change with time, the alarm will be sounded since this corresponds to a grazing course with the obstacle (see FIG. 5, possible flight path from point 245 to point 247). In such a case the differentiator output is constant corresponding to the dashed lines in curves Q and R. However the output is also constant if the shadow is completely absent. To prevent sounding the alarm 210 in such an event, the "and" gate circuit 160 is provided so that the alarm circuit is not excited unless signals from the differentiator circuit 156 and the peak rider circuit 158 exist simultaneously.

This is accomplished by noting the existence of a shadow pulse at the output of the "and" gate 135 via the tube 162. In such a case the parameters of the peak rider circuit 158 are so selected that a shadow pulse through it gates the signal from the differentiator 156, otherwise not.

When the differentiator output is constant and passed through the "and" gate circuit 160 the alarm should sound. When the output is negative corresponding to an increasing shadow width, the alarm should sound. When the output is positive indicating a decreasing shadow width, no alarm is sounded. The distance which the aircraft should remain away from an object can be set into the alarm circuit by the selection of its components.

The use of the "or" gate circuit 200 in connection with the alarm enables any one of the analyzing circuits, such as 152, which has a dangerous shadow, to trigger on the alarm.

As a nuisance eliminating or discriminating device the circuit 206 ensures that only those signals from apparently dangerous obstacles which repeat more than a predetermined number of times will be transferred to the alarm 210. This will prevent the alarm from sounding even when all the shadow pulses being interpreted are suddenly shifted to different analyzing circuits and therefore appear dangerous or if some instantaneously existing clutter is picked up and analyzed by mistake. When this happens the circuit 206 gives the terrain clearance system time to settle down before any alarm will sound.

I have, in the drawings and specification, presented a detailed disclosure of the preferred embodiment of my invention. It is to be understood that the invention is susceptible of modification, structural changes and various applications of use within the spirit and scope of the invention and I do not plan to limit the invention to the specific form disclosed, but rather intend to cover all modifications, changes and alternative constructions and methods falling within the scope of the principles taught by my invention.

What is claimed:

1. A terrain clearance system for use with an airborne radar set comprising means adapted to be connected to said radar set responsive to shadow portions in the output signal from said radar set for producing a signal having an analog function indicative of the length of said shadow portions, and means for determining if said analog function is changing with respect to time.

2. In combination with a radar set provided with a transmitter for transmitting pulse signals and a receiver for receiving pulse signals reflected back from an obstacle in the path of the transmitted signals, said receiver producing an output signal for each received signal having therein a first energy level portion indicative of the presence of the obstacle and a second energy level portion having a width representative of the length of shadow cast by said obstacle, a terrain clearance system comprising means for producing a plurality of proportional signals with one proportional signal for each receiver output signal which is proportional in magnitude to the width of said second energy level portion, and means for sensing any change in magnitude between said proportional signals.

3. The combination set forth in claim 2 in which said second energy level portion in substantially zero in magnitude.

4. The combination set forth in claim 2 including means for preventing passage to said sensing means of any of said proportional signals having a magnitude less than a predetermined value.

5. In combination with a radar set provided with a transmitter for transmitting pulse signals and a receiver for receiving pulse signals reflected back from an obstacle in the path of the transmitted signals, said receiver producing a series of video signals each having a portion thereof of one amplitude which is indicative of the presence of a given obstacle and a second portion of another amplitude having a width representative of the length of shadow cast by said given obstacle, a terrain clearance system comprising means for producing a succession of electrical signals therefor each of said succession of electrical signals being proportional in magnitude to the width of the shadow portion of a video signal indicative of said given obstacle at the time said shadow portion is produced, and means for detecting any change in the magnitude of said successively produced electrical signals from said given obstacle.

6. The combination set forth in claim 5 in which each of said succession of signals is of the same amplitude but variable in width to give said proportional magnitude.

7. The combination set forth in claim 6 including means for discriminating between widths of said succession of signals, said discriminating means permitting only signals having a given width to pass to said detecting means.

8. The combination set forth in claim 7 including a device responsive to said detecting means for indicating a predetermined rate change in the width of said successive signals.

9. The combination set forth in claim 8 in which said responsive device provides an indication only when the widths of said successive signals are remaining constant or increasing.

10. In combination with a radar set provided with a transmitter for transmitting pulse signals and a receiver for receiving pulse signals reflected back from an obstacle in the path of the transmitted signals, said receiver producing an output signal varying in accordance with the presence of reflected signals from said obstacle and the absence of any reflected signals due to the shadow cast by said obstacle, a terrain clearance system comprising means for producing an analog signal having a function corresponding to the period in which there are no reflected signals, and means for determining whether said analog signal is changing.

11. In combination with a radar set provided with a transmitter for transmitting pulse signals and a receiver for receiving pulse signals reflected back from an obstacle in the path of the transmitted signals, said receiver producing a series of output signals representative of the time it takes for said transmitted signals to return to the receiver from the terrain including said obstacle and varying in amplitude representative of the amount of reflected energy with a period of no reflected energy being indicative of the length of shadow cast by said obstacle, a terrain clearance system comprising means for producing a signal having a value corresponding to said period of no reflected energy, and means for determining whether said value is changing.

12. In combination with a radar set provided with a transmitter for transmitting pulse signals and a receiver for receiving pulse signals reflected back from the ground and an obstacle projecting upwardly therefrom in the path of the transmitted signals, said receiver producing an output derived from signals reflected from the ground and said obstacle and substantially no output for a period corresponding to the length of shadow cast by said obstacle, a terrain clearance system comprising circuit means for producing a series of electrical signals, each electrical signal being produced at the beginning of said shadow period and substantially terminating at the end of said shadow period for each received signal, and means for determining if each of said electrical signals is becoming larger or smaller to thereby provide an indication of the rate of change of the shadow cast by said obstacle.

13. The combination set forth in claim 12 in which said series of electrical signals are in the form of a series of electrical pulses having substantially the same height but a width dependent upon the length of shadow and said rate determining means determining whether the pulses of said series of pulses are changing in width at a certain rate.

14. The combination set forth in claim 13 including means providing an indication when said rate determining means determines that the pulses are changing in width at a rate equal to or greater than said certain rate.

15. In combination with a radar set provided with a transmitter for transmitting pulse signals and a receiver for receiving pulse signals reflected back from an upwardly projecting obstacle and the ground on the far side thereof in the path of the transmitted signals, said receiver producing an electrical output signal for each reflected signal including a first voltage portion having a magnitude indicative of the presence of the obstacle, a substantially zero voltage portion having a width indicative of the length of shadow cast by said obstacle and a second voltage portion indicative of the ground beyond said shadow on the far side of said obstacle, a terrain clearance system comprising means for producing a voltage pulse for each receiver output signal having a width proportional to said zero voltage portion, integrating means for producing a signal changing at a rate corresponding to the rate of change of said voltage pulses, and differentiating means for determining whether the signal produced by said integrating means is changing at a rate equal to or greater than a predetermined rate.

16. In combination with a radar set provided with a transmitter for transmitting pulse signals and a receiver for receiving pulse signals reflected back from an upwardly projecting obstacle and the ground on the far side thereof in the path of the transmitted signals, said receiver producing an electrical output signal for each reflected signal including a first voltage portion having a magnitude indicative of the presence of the obstacle, a substantially zero voltage portion having a width indicative of the length of shadow cast by said obstacle and a second voltage portion indicative of the ground beyond said shadow on the far side of said obstacle, a terrain clearance system comprising means for amplifying, inverting and clipping said first and second voltage portions to produce a series of second derived signals each including a voltage pulse having a width proportional to the width of said zero voltage portions in said receiver output signal and hence proportional in width to the length of shadow cast by said obstacle, and means for determining whether the width of pulses in said series of derived signals is changing.

17. The combination set forth in claim 16 in which said last mentioned means includes an integrator for integrating said voltage pulses to provide an integrated output voltage increasing in magnitude at a rate dependent upon whether the pulse widths are increasing or decreasing and a differentiator for producing a direct current voltage having one polarity when said integrated voltage is increasing in magnitude at a rate greater than a certain rate and a reverse polarity when said integrated voltage is increasing in magnitude at a rate less than said certain rate.

18. The combination set forth in claim 17 including peak rider means connected to the input side of said integrator, and gate means connected to the output side of said differentiator and to the output side of said peak rider means for producing a signal only when there is a simultaneous output from said differentiator and said peak rider means.

19. The combination set forth in claim 18 including a signal response mechanism controlled by said gate means when said gate means is producing a signal.

20. The combination set forth in claim 19 including gate means for preventing voltage pulses having less than a predetermined width from reaching said integrator.

21. In combination with a radar set provided with a transmitter for transmitting pulse signals and a receiver for receiving pulse signals reflected back from upwardly projecting obstacles and ground areas between said obstacles in the path of the transmitted signals, said receiver producing an output signal for each received signal including therein various voltage portions having a magnitude indicative of the presence of the obstacles, substantially zero voltage portions having widths indicative of the respective length of shadows cast by said objects and additional voltage portions indicative of the ground areas beyond the respective shadows on the far sides of said obstacles, a terrain clearance system comprising means for producing a voltage pulse for each zero portion in said receiver output signals having a width proportional to the zero voltage it represents, a plurality of means for determining the rate of change in width of said pulses, and switching means for channeling the pulses derived from a given obstacle to a particular rate determining means.

22. The combination set forth in claim 21 in which the nearest obstacle is always channeled to the same rate determining means.

23. The combination set forth in claim 22 including means for preventing passage of pulses having less than a predetermined width to said plurality of rate determining means.

24. In combination with a radar set provided with a transmitter for transmitting pulse signals and a receiver for receiving pulse signals reflected back from upwardly projecting obstacles and ground areas between said obstacles in the path of the transmitted signals, said receiver producing an output signal for each received signal including therein various voltage portions having a magnitude indicative of the presence of the obstacles, substantially zero voltage portions having widths indicative of the respective length of shadows cast by said objects and additional voltage portions indicative of the ground areas beyond the respective shadows on the far sides of said obstacles, a terrain clearance system comprising means for producing a voltage pulse for each zero portion in said receiver output signals having a width proportional to the zero voltage it represents, a plurality of means for determining the rate of change in width of said pulses to produce an output when the pulse rate of change is constant or increasing, switching means for channeling the pulses derived from said obstacles to said plurality of rate determining means in sequence, means between said pulse producing means and said switching means for preventing passage of pulses to said switching means having less than a predetermined width, and signal means responsive to said rate determining means output.

25. The combination set forth in claim 24 including means between said rate determining means and said signal means for actuating said signal means only when said output of said rate determining means persists for a predetermined period of time.

26. In combination with a radar set provided with a transmitter for transmitting pulse signals and a receiver for receiving pulse signals reflected back from upwardly projecting obstacles and ground areas between said obstacles in the path of the transmitted signals, said receiver producing an output signal for each received signal including therein various voltage portions having a magnitude indicative of the presence of the obstacles, substantially zero voltage portions having widths indicative of the respective length of shadows cast by said objects and additional voltage portions indicative of the ground areas beyond the respective shadows on the far sides of said obstacles, a terrain clearance system comprising means for amplifying and clipping said receiver signals to produce a series of derived signals including voltage pulses having a uniform amplitude and having widths proportional to the widths of said zero voltage portions in said receiver output signals and hence proportional in width to the shadow lengths cast by said obstacles at each time a receiver output signal is produced, a plurality of analyzing circuits for determining whether the widths of said pulses are changing for a given obstacle, and means connected to said amplifying and clipping means for switching the output from said amplifying and clipping means to successive analyzing circuits.

27. The combination set forth in claim 26 including a differentiator responsive to the trailing edges of said voltage pulses for advancing said switching means from one analyzing circuit to another.

28. The combination set forth in claim 27 in which said switching means includes a flip-flop circuit triggered by said differentiator, a beam switching tube provided with a plurality of target plates, spades, switching grids and a cathode, said switching grids being connected to said flip-flop circuit so that certain of said grids will be energized when said flip-flop circuit has been triggered into one stable state and the other of said grids will be energized when said flip-flop circuit has been triggered into its other stable state, said switching means further including a series of "and" gates having one input side connected in circuit with the respective target plates of said beam switching tube, a second input side connected to receive said pulses, and each output side connected to an analyzing circuit.

29. The combination set forth in claim 28 including a blocking oscillator connected to said transmitter and to all of said spades, said blocking oscillator being triggered by said transmitter to deenergize said spades upon transmission of a transmitted signal.

30. The combination set forth in claim 29 including means connected to said transmitter and to one of said spades for assuring that said one spade will be energized upon transmission of a transmitted signal.

31. The combination set forth in claim 30 including a warning device responsive to an output from any one of said analyzing circuits and means for actuating said warning device only when said output of one of said analyzing circuits persists for a predetermined period of time.

32. In combination with a radar set provided with a transmitter for transmitting pulse signals and a receiver for receiving pulse signals reflected back from upwardly projecting obstacles and ground areas between said obstacles in the path of the transmitted signals, said receiver producing an output signal for each received signal including therein various voltage portions having a magnitude indicative of the presence of the obstacles, substantially zero voltage portions having widths indicative of the respective length of shadows cast by said objects and additional voltage portions indicative of the ground areas beyond the respective shadows on the far sides of said obstacles, a terrain clearance system comprising means for amplifying and clipping said receiver signals to produce a series of derived signals including voltage pulses having a uniform amplitude and having widths proportional to the widths of said zero voltage portions in said receiver output signals and hence proportional in width to the shadow lengths cast by said obstacles at each time a receiver output signal is produced, means connected to said amplifying and clipping means for preventing passage of pulses having a relatively narrow width, a plurality of "and" gates each having a pair of input sides and an output side, one of said input sides being connected to said last-mentioned means, differentiating and clipping means also connected to said last-mentioned means for producing a triggering voltage pip at the trailing edge of each pulse, a flip-flop circuit having an input side connected to said differentiating and clipping means and having a pair of output sides either of which is energized depending upon which of the two stable states said flip-flop circuit has been triggered into by said pips, a beam switching tube provided with a plurality of target plates, spades, switching grids and a cathode, alternate of said switching grids being connected to one of said flip-flop output sides and the remaining grids to the other of said flip-flop output sides, a blocking oscillator connected to said transmitter and to each of said spades for interrupting electron flow to all of said spades upon receipt of a transmitted signal from said transmitter, clipping and inverting means also coupled to said transmitter and to a certain one of said spades for conditioning electron flow between said certain spade and its associated target plate, means connecting a second input side of said flip-flop circuit to said transmitter for establishing electron flow between said cathode and said target plate associated with said certain spade when said flip-flop circuit has energized the particular switching grid associated therewith, the other input side of each "and" gate being connected to a target plate of said beam switching tube so that an output signal from said "and" gates will be produced only when the input sides of an "and" gate are simultaneously energized, and a plurality of analyzing circuits connected to said target plates for determining the rate of change in width of said pulses.

33. The combination set forth in claim 32 in which each analyzing circuit includes an integrator connected to the target plate associated with that particular analyzing circuit for producing an integrated voltage signal changing in magnitude at a rate representative of the rate at which the pulse widths are changing and a differentiator for producing an output signal having a given polarity when said integrated voltage signal is increasing and an output signal having a reverse polarity when said integrated voltage signal is decreasing.

34. The combination set forth in claim 33 in which each analyzing circuit also includes peak rider means connected to the targe plate associated with that particular analyzing circuit and an "and" gate having one input side connected to said peak rider means and its other input side connected to the output side of said differentiator whereby an output is produced by any one of said last-mentioned "and" gates only when there is a simultaneous output present from both the peak rider means and the differentiator associated therewith.

35. The combination set forth in claim 34 including an alarm actuated by an output from any one of said last-mentioned "and" gates.

36. The combination set forth in claim 35 including timing means between said alarm and said last-mentioned "and" gates requiring an output from said last-mentioned "and" gates to persist for a predetermined interval of time before actuation of said alarm.

37. A terrain clearance system for use with an airborne radar set comprising means adapted to be connected to said radar set responsive to shadow portions in the output signal from said radar set for producing a signal having a function indicative of the length of said shadow portions, and means for determining if said function is changing with respect to time.

38. A terrain clearance system for use with an airborne radar set comprising means adapted to be connected to said radar set for producing a series of signals having a time variable function indicative of the length of successive shadow portions contained in the various signals received by said radar set, and means for providing an indication of the time span of each of said time variable signals.

39. The combination set forth in claim 38 including means for determining whether the time span of each of said time variable signals is changing.

40. The combination set forth in claim 39 in which said last-mentioned means includes a decision circuit for producing an output signal if the time span of successive time variable signals is either constant or increasing.

41. The combination set forth in claim 40 including a signal mechanism connected to said decision circuit and actuated upon receipt of said output signal.

42. In combination with a radar set provided with a transmitter for transmitting pulse signals and a receiver for receiving pulse signals reflected back from an obstacle in the path of the transmitted signals, said receiver producing an output signal for each received signal having therein a first energy level portion indicative of the presence of the obstacle and a second energy level portion having a width representative of the length of shadow cast by said obstacle, a terrain clearance system comprising means for producing a signal for each receiver output signal which is proportional in time to the width of said second energy level portion, and means for sensing any change in time between said second energy level portions of successive receiver output signals created by said signals reflected back from said obstacle.

43. The combination set forth in claim 42 in which said second energy level portion is substantially zero in magnitude.

44. The combination set forth in claim 43 including means for preventing passage to said means for sensing any change in time of any of said second energy level portions having a time span less than a predetermined value.

45. In combination with a radar set provided with a transmitter for transmitting pulse signals and a receiver for receiving pulse signals reflected back from an obstacle in the path of the transmitted signals, said receiver producing a series of video signals each having a portion thereof of one amplitude which is indicative of the presence of the obstacle and a second portion of another amplitude having a width representative of the length of shadow cast by said obstacle, a terrain clearance system comprising means for producing a succession of electrical signals at different times each of which signals varies in magnitude at the beginning of a shadow portion contained in a video signal and also varies at the end of the same shadow portion, and means for obtaining an indication of the interval of time prevailing between the beginning and the end of each successively produced signal.

46. The combination set forth in claim 45 including means for comparing the time intervals of the second portion of the successive signals of said series of video signals.

47. The combination set forth in claim 46 including an alarm means associated with said time interval means which is activated when said time intervals are either constant or increasing.

48. In combination with a radar set provided with a transmitter for transmitting pulse signals and a receiver for receiving pulse signals reflected back from a plurality of obstacles in the path of the transmitted signals, said receiver producing a series of video signals each having portions thereof having respective widths which are indicative of the length of shadows cast by said obstacles, a terrain clearance system comprising means for producing an electrical signal for each video signal reflected back from each obstacle containing pulses having a time duration proportional to the length of shadow cast by said obstacle and means for determining whether the pulse length of time for corresponding pulses of successive electrical signals derived from the same object is changing.

No references cited.